(12) United States Patent
Hachtel

(10) Patent No.: US 6,244,672 B1
(45) Date of Patent: Jun. 12, 2001

(54) METHOD AND APPARATUS FOR CONTROLLING A BRAKE SYSTEM

(75) Inventor: Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/111,561

(22) Filed: Jul. 8, 1998

(30) Foreign Application Priority Data

Jul. 8, 1997 (DE) .............................. 197 29 097

(51) Int. Cl.[7] .............................. B60T 8/32; B60T 8/48; B60T 8/92; B60T 17/18; B60T 8/00
(52) U.S. Cl. .............................. 303/122.09; 303/122.13; 303/191; 303/DIG. 4; 303/166; 303/155; 303/116.1; 303/115.1
(58) Field of Search .............................. 303/166, DIG. 3, 303/167, DIG. 4, 122.13, 122.12, 122.04, 155, 122, 122.05, 115.1, 115.4, 115.5, 113.1, 116.1, 119.1, 15, 3, 174, 176, DIG. 11, 10–12, 191; 701/76, 70, 71, 92; 417/38

(56) References Cited

U.S. PATENT DOCUMENTS

| | | | |
|---|---|---|---|
| 3,610,702 | * | 10/1971 | MacDuff . |
| 4,523,791 | * | 6/1985 | Belart et al. ................ 303/DIG. 4 |
| 4,749,239 | * | 6/1988 | Onogi et al. . |
| 4,800,498 | * | 1/1989 | Matsui et al. ................ 303/DIG. 4 |
| 5,393,131 | * | 2/1995 | Nomura et al. . |
| 5,413,404 | * | 5/1995 | Inagawa . |
| 5,577,812 | * | 11/1996 | Hirano et al. ................ 303/DIG. 4 |
| 5,631,632 | * | 5/1997 | Nakashima et al. . |
| 5,683,149 | * | 11/1997 | Aizawa et al. ................ 303/122.13 |
| 5,700,069 | * | 12/1997 | Yokoyama et al. ............ 303/115.4 |
| 5,743,598 | * | 4/1998 | Toda et al. .................... 303/DIG. 4 |
| 5,779,327 | * | 7/1998 | Nakashima et al. ............ 303/122.12 |
| 5,791,745 | * | 8/1998 | Sakakibara ................... 303/DIG. 4 |
| 5,884,986 | * | 3/1999 | Shimizu ...................... 303/122.13 |
| 5,992,952 | * | 11/1999 | Kubota . |

FOREIGN PATENT DOCUMENTS

| | | |
|---|---|---|
| 2316986 | 3/1998 | (GB) . |
| 2327105 * | 1/1999 | (GB) . |
| 6312655 * | 11/1994 | (JP) . |
| 1170871 * | 3/1999 | (JP) . |
| 9723373 * | 7/1997 | (WO) . |
| 9828174 * | 7/1998 | (WO) . |

* cited by examiner

*Primary Examiner*—Douglas C. Butler
(74) *Attorney, Agent, or Firm*—Kenyon & Kenyon

(57) ABSTRACT

A method and an apparatus for controlling a brake system, the brake pressure of at least one wheel brake being controlled electrically as a function of at least the braking request of the driver. The brake system includes a high-pressure reservoir, whose pressure is detected and taken into consideration in controlling the brake system. In case of failure of the reservoir pressure detection system, the reservoir pressure is estimated on the basis of a model, and the estimated reservoir pressure is taken into consideration in controlling the brake system.

12 Claims, 4 Drawing Sheets

METHOD AND APPARATUS FOR CONTROLLING A BRAKE SYSTEM

FIELD OF THE INVENTION

The present invention relates to a method and an apparatus for controlling a brake system, specifically to guarantee the operation of an electrically controlled brake system even if the reservoir pressure detection system fails.

BACKGROUND INFORMATION

An electro-hydraulic brake system is described in SAE Paper 96/0991, where a braking request by the driver is derived from brake pedal activation by the driver. This braking request is converted into reference brake pressures for the individual wheel brakes, taking into consideration other operating variables. The reference brake pressures are established by pressure control circuits for each wheel, on the basis of the pre-determined reference brake pressure as well as the actual brake pressure measured in the area of the wheel brake. In such a hydraulic brake system, a reservoir is provided, which is charged by an electrically controlled pump for the pressure supply. In this connection, the pump is activated to charge the reservoir if the pressure in the reservoir goes below a certain value. For this purpose, a reservoir pressure sensor is provided, which detects the pressure in the pressure supply reservoir of the brake system. The reservoir pressure is also evaluated in connection with other functions of the brake system, for example, the pressure control circuits. If the reservoir pressure sensor fails, the system does not have a measurement value available for the reservoir pressure. The functions dependent on the reservoir pressure can therefore not be performed, or can only be performed in a greatly restricted manner.

SUMMARY OF THE INVENTION

The present invention provides a method and an apparatus to guarantee operation of an electrically controlled brake system even if the reservoir pressure detection system fails, thereby improving the availability of the brake system. According to the present invention, it is not necessary to shut the electrical brake system off, but rather control of the brake system can be carried out on the basis of an approximate, estimated reservoir pressure.

According to the present invention, the pump control continues to operate and the full brake effect continues to be available in an electrically controlled manner.

According to the present invention, the determination of the reservoir pressure by approximation can be checked in the non-braking state, by activating the pump, and corrected if necessary.

An improvement in estimating the reservoir pressure results if the temperature of the brake system, particularly of the hydraulic unit, is also evaluated.

DETAILED DESCRIPTION

Figure 1:
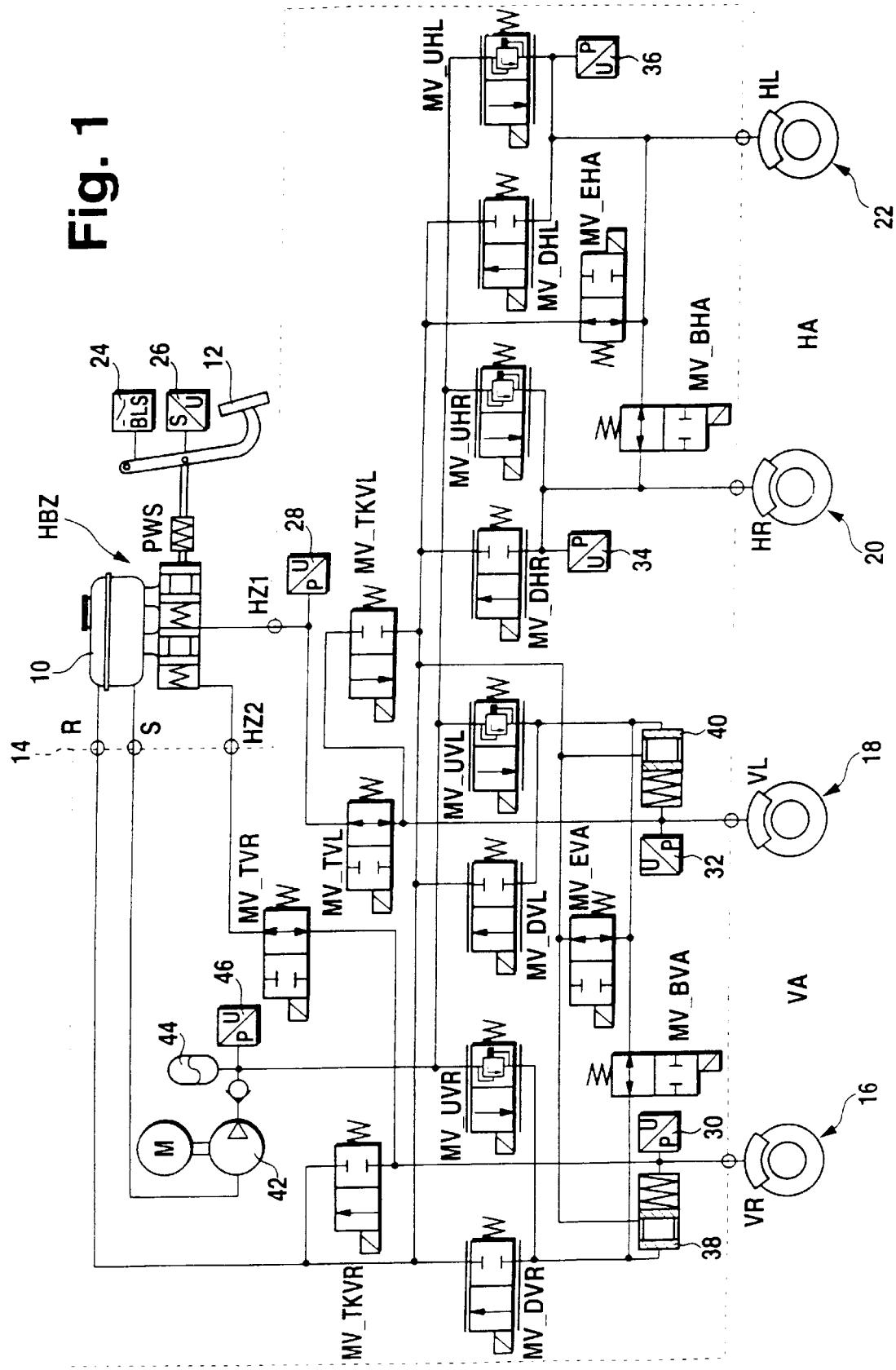
FIG. 1 shows a preferred exemplary embodiment of an electro-hydraulic brake system according to the present invention.

FIG. 1 shows a preferred exemplary embodiment of an electro-hydraulic brake system. It shows a master brake cylinder HBZ with a supply container 10, to which a brake pedal 12 which can be activated by the driver is affixed. Furthermore, a hydraulic unit 14 is provided, which includes valve and pump arrangements for controlling wheel brakes 16, 18, 20, and 22. A brake pedal switch 24 is connected with brake pedal 12, and closes a circuit when the brake pedal is activated, as well as a measurement device 26 for detecting the excursion of the brake pedal. Furthermore, a pedal path simulator PWS is provided, which simulates a counter-force for the driver when the brake pedal is activated. Two brake circuits HZ1 and HZ2 are connected to the master brake cylinder (HBZ). An isolation valve MV_TVR and MV_TVL is inserted in these circuits, in each instance, and this valve is closed, in the case of the electrically controlled brake system, by energizing it. Ahead of the isolation valve, a pressure sensor 28 measures the pressure applied by the driver via brake pedal activation, in at least one of the brake circuits.

If the isolation valves are closed, the master brake cylinder is hydraulically isolated from the pressure control system. The pressure control system includes a pressure modulator for pressure regulation for each wheel brake. In this connection, a pressure modulator includes an inlet valve (MV_UVR, MV_UVL, MV_UHR, MV_UHL), an outlet valve (MV_DVR, MV_DVL, MV_DHR, MV_DHL), and a pressure sensor 30, 32, 34, and 36, which measures the pressure in the line leading to the wheel brake, in each instance. In the two front wheel pressure modulators, there is a media isolation piston 38 and 40 between the valves (inlet and outlet valve) and the pressure sensors, i.e. the wheel brake, in each instance. The pressure modulators are connected via equalization valves MV_BVA and MV_BHA, which can be controlled independently of one another when energized. Furthermore, relief valves MV_EVA and MV_EHA, respectively, are provided for each axle, which allow pressure to be relieved from the wheel pressure modulators of an axle when no current is applied. They connect the pressure modulators of an axle with the return lines leading to supply container 10. In the electrically controlled operating state, these two valves are permanently energized, i.e. they are closed. Furthermore, a temperature compensation valve MV_TKVL and MV_TKVR is provided for each front wheel pressure modulator, in each instance. These valves are closed when not energized, and are opened to relieve pressure from the pressure modulator of a front wheel, by applying current, if certain conditions are met, particularly a very long braking period. The temperature compensation valves connect the brake line to the wheel brake with the return line. The energy for brake pressure modulation comes from a single-piston high-pressure pump 42 driven by an electric motor. This motor is connected to a high-pressure reservoir 44, as an intermediate buffer, and a pressure sensor 46 detects the pressure in this reservoir. The pressure line of pump 42 leads to the inlet valves of the wheel brakes, while the suction line of pump 42 is connected with supply container 10. With regard to details of the hydraulic circuit, reference is made to the preferred exemplary embodiment shown in FIG. 1. However, the method according to the present invention, as described below, can be used anywhere where pressure in a reservoir element is detected and used to control a brake system, in connection with an electrically controlled brake system with an electrically controlled pressure supply.

In normal operation, the brake system described in FIG. 1 functions as follows. The driver steps on the brake pedal 12. As he does so, he feels a path-dependent counter-force. This path dependence is formed by the defined characteristics of the pedal path simulator PWS. When a braking request is sensed via the pedal path sensor, the brake pedal switch 24, and/or the pressure sensor 28, the isolation valves (MV_TVR and MV_TVL) and the relief valves (MV_EVA and MV_EHA) are closed. A pressure builds up in main brake cylinder HBZ, resulting from the pedal force. The braking request by the driver is calculated from the signals of brake light switch 24, path sensor 26, and/or pressure sensor 28, for example as a reference delay or as a reference brake force. The individual reference wheel brake pressures are formed from this braking request. Depending on the driving conditions and the wheel slip conditions, these pressures are modified and adjusted via the wheel pressure modulators, by energizing the valves. In a closed control circuit, the current pressures at the wheel pressure sensors are used for a reference/actual comparison, at each brake. If the reference pressure in the left and right wheel of an axle are different, the equalization valves are closed and the predetermined reference pressure in each wheel brake is adjusted by controlling the inlet and outlet valves, in the sense of regulating the actual brake pressure to the reference brake pressure. If the same reference brake pressure is required in both wheel brakes, the wheel brake pressure in both wheel brakes can be regulated on the basis of only one pressure modulator, depending on the dynamic demands. This is particularly provided in operating states in which low dynamic demands are met. To build up the pressure at a wheel brake, the inlet valve is energized until the desired reference pressure is formed in the wheel brake, with the desired dynamics. A pressure decrease is achieved analogously, by energizing the outlet valve, causing brake fluid to flow back into the supply container, via the return line. The relief valves go into effect if the system fails. If the electrical system fails during braking, all the valves return to the non-energized state. The relief valves then open the pressure modulators to the return line, so that no brake pressure can be locked in. Likewise, these valves allow volume equalization to the container in case of temperature variations, in the rest state.

Activation of pump 42 takes place during an active braking process and/or if the reservoir pressure in reservoir 44 drops below a pre-determined value. In addition to this function, reservoir pressure which is detected is also assessed within the framework of regulation, since it essentially represents the pressure existing at the inlet of the inlet valves.

Figure 2:
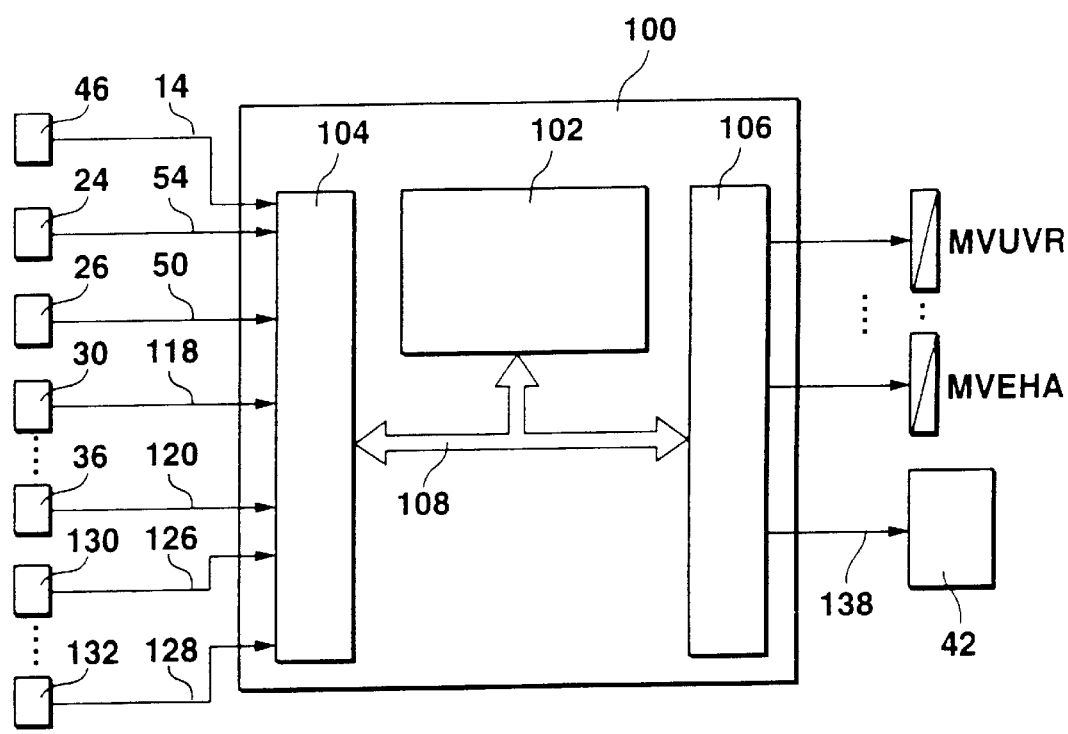
FIG. 2 shows an exemplary control unit which controls the electro-hydraulic brake system according to the present invention.

The electrically activated valves as well as pump 42 are controlled by at least one electronic control unit 100, as outlined in FIG. 2. In this connection, this unit includes at least a microcomputer 102, an input circuit 104, an output circuit 106, and a bus system 108 which connects these elements, for reciprocal data exchange. Lines 50 and 54 of brake pedal switch 24 and pedal path sensor 26 lead to input circuit 104. Furthermore, input lines 118 to 120 connect input circuit 104 with sensors 30 to 36 assigned to each wheel brake. Furthermore, an input line 140 is provided, which leads from measurement device 46 for detecting the reservoir pressure to input line 104. Other input lines 126 to 128 connect input circuit 104 with measurement devices 130 to 132 for detecting additional operating variables of the brake system, the vehicle, and/or its drive unit. Such operating variables are, for example, the wheel velocities, if necessary the engine torque produced by the drive unit, axle loads, the pressure in the brake line (sensor 28), etc. Several output lines are connected with output circuit 106. For example, the output lines via which the valves of the pressure modulators are activated are shown. Pump 42 is controlled via another output line 138. Control unit 100 controls the brake system as a function of the signal values applied to it, in the sense described above.

Detection of the reservoir pressure is a significant element in electrical control of the brake system. If the reservoir pressure detection system fails, it is not possible to regulate the brake pressure optimally, or to regulate the pump as a function of reservoir pressure. Therefore it is provided that if the reservoir pressure detection system fails, the reservoir pressure will be estimated by approximation, using a hydraulic model. For this purpose, the volumes flowing into and out of the high-pressure reservoir are calculated. The outflowing volumes are calculated using the known pressure/volume characteristic curves of the wheel circuit (elasticity of the brake hose and brake jaws). This pressure/volume characteristic curve is known and stored in memory. The outflowing volume is read out of the characteristic curve as a function of the brake pressure (sensors 30 to 36). The inflowing volumes are calculated via the pump transport output. Therefore the volume supplied to the reservoir when the pump is turned on is known. This is done by determining the pump motor voltage. The volume supplied to the reservoir pressure, i.e. the volume transported to the reservoir by the pump, can be determined by way of the time period during which the pump is switched on, and the pump motor voltage. This is done on the basis of a characteristic curve in which the volume transported by the pump per time unit is stored in memory above the pump motor voltage. From the volume change calculated from the inflowing and outflowing volumes, the reservoir pressure can then be estimated using the general gas equation $(p*v)/T=$constant. In this connection, the outside temperature is assumed to be the temperature. A significantly improved accuracy of the reservoir pressure estimate can be achieved in that the temperature of the hydraulic unit is measured or, for example, estimated from the pump after-run. This information can be used not only for calculating the general gas equation, but also for correcting the pressure/volume characteristic curves and/or for determining the transport output of the pump.

In order to prevent the model from miscalculating and determining an incorrect reservoir pressure, a reference point is introduced to support the model. It is of assistance in this connection that the pressure inlet valves do not open until a certain current level is reached. For currents less than a predetermined limit IPO, the inlet valves are closed, while they are open for greater currents. If one of the inlet valves is now energized with a current which lies below the current limit (e.g. at 90%), when the reference pressure default for the electrical brake system is zero, then the reservoir pressure will increase after the pump is switched on. The reservoir pressure continues to rise until the inlet valve, which has been constantly energized, can no longer hold the reservoir pressure and slowly opens. This results in a pressure increase in a wheel, if the switching valves are closed (separating valves, balance valves, relief valves). This pressure increase can be measured. The reservoir pressure at which this inlet valve opens is known, or it can be detected and stored in memory during the period of operation, with a functioning reservoir pressure sensor. After this reservoir pressure value has been reached, the pump is shut off. The reservoir pressure value currently determined via the model is compared with this reference value and, if the deviations are too great, the reference value is used as the basis for calculating the pressure from the volume change, as part of reinitializing the reservoir pressure model.

Figure 3:
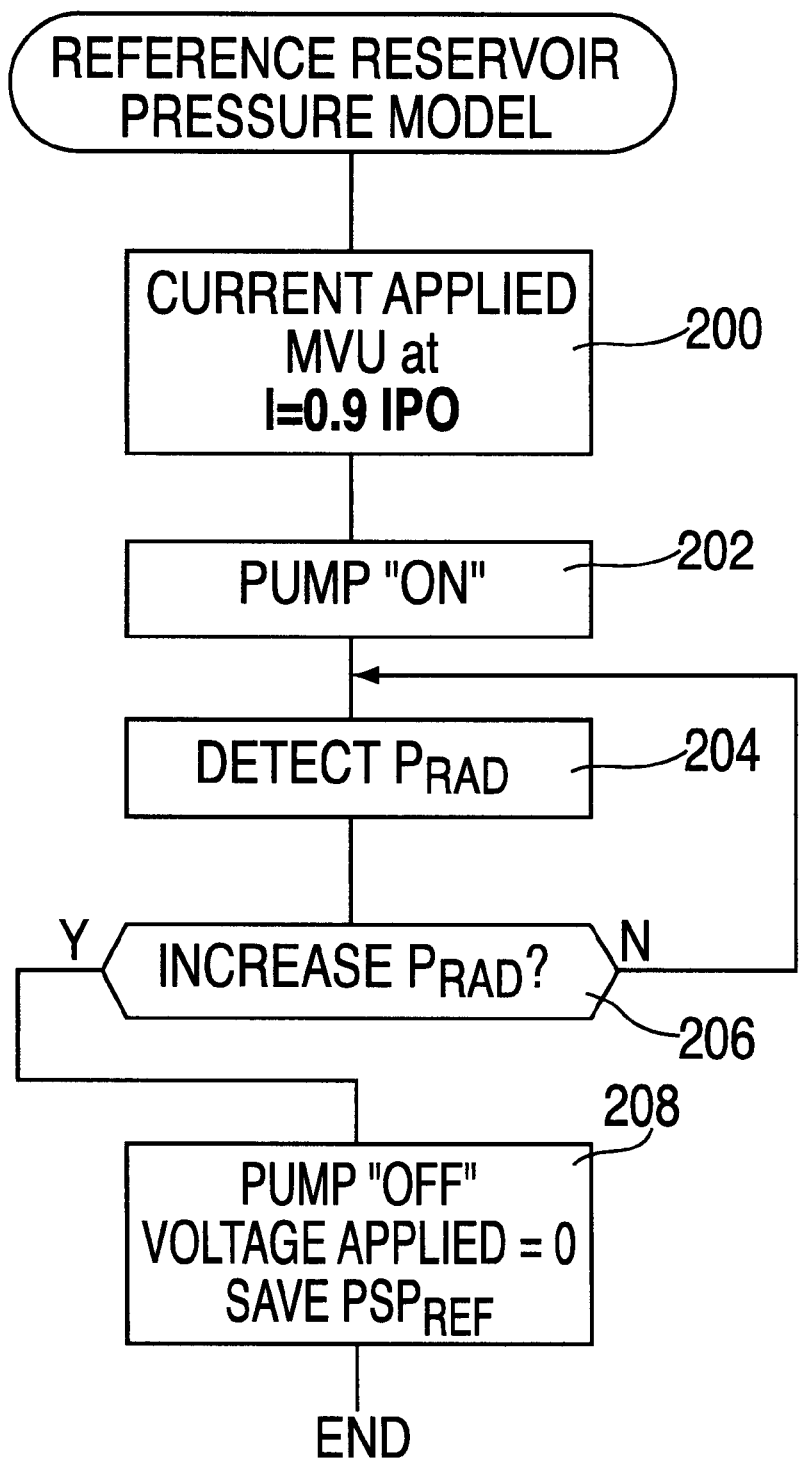
FIG. 3 shows an exemplary flow chart as a program of a microcomputer for determination of a reference value for a reservoir pressure model according to the present invention.
Figure 4:
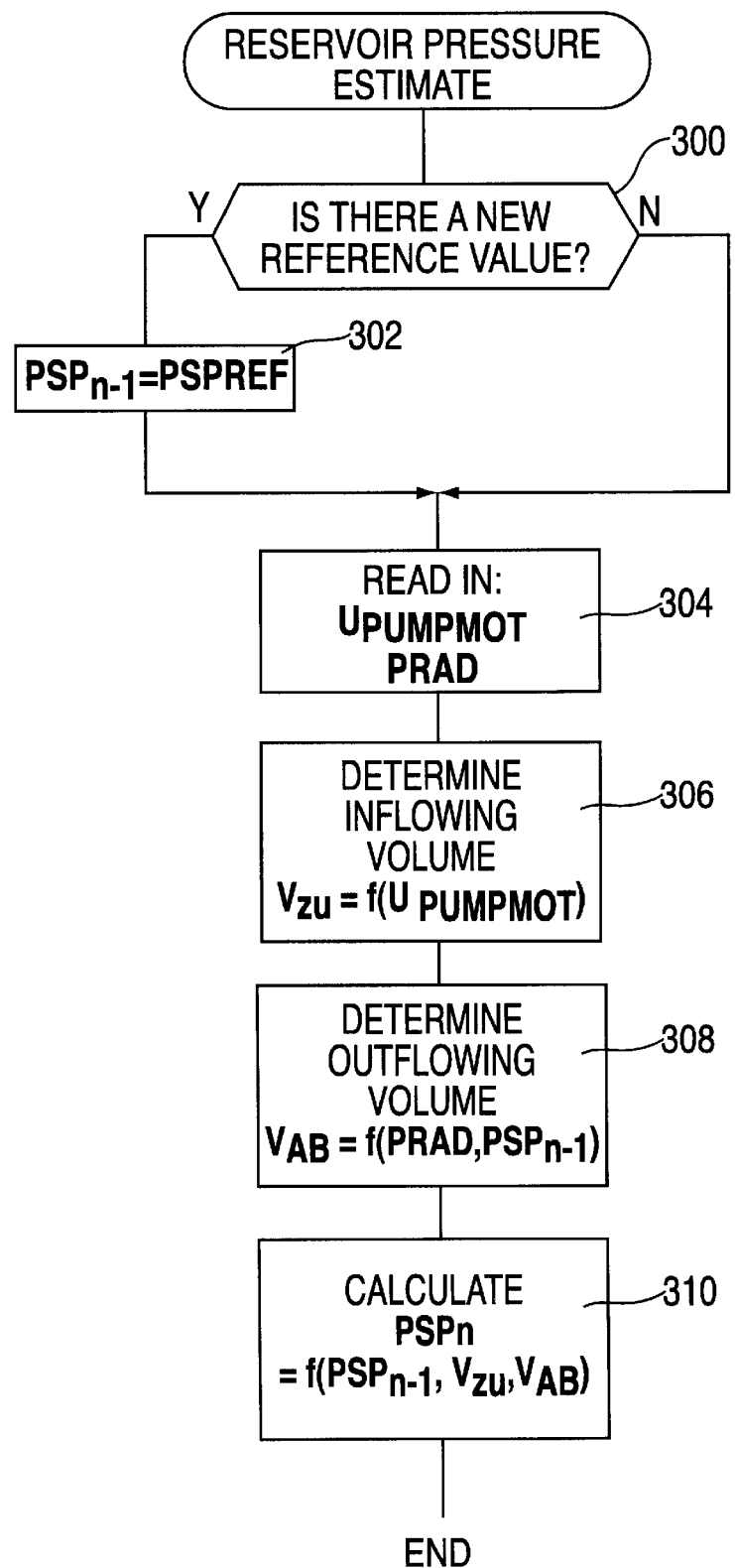
FIG. 4 shows an exemplary flow chart as a program of a microcomputer for a method of procedure for estimation the reservoir pressure according to the present invention.

The method of procedure as described for determining the reference value and for calculating or estimating the reservoir pressure is implemented as a program of the microcomputer of control unit 100, in the preferred exemplary embodiment. FIGS. 3 and 4 show flow charts which outline such a program. FIG. 3 shows a determination of the reference value for the reservoir pressure model, while FIG. 4 shows a method of procedure for estimating the reservoir pressure.

The exemplary program outlined in FIG. 3 runs to detect the reference value for the reservoir pressure if the reservoir pressure sensor is working, in a preferred embodiment, while it runs to support the pressure model if the reservoir pressure sensor is defective. The program is initiated at pre-determined points in time when the pedal is not activated, i.e. when the brake pedal switch 24 is not closed, and when there are no braking requirements from other systems, such as control of power train slip control or regulation of driving dynamics. In a first step 200, at least one pressure inlet valve (e.g. MV_UVR) is energized with a current which is slightly less than the current IPO which results in opening of the valve. In a preferred exemplary embodiment, one of the inlet valves is energized with a current which is 90% of the opening current IPO. Since neither brake pedal activation nor a pressure requirement from other systems is present at the same time, the reference pressure default for the braking system and the wheel brake pressure is zero. In step 202, which follows step 200, the pump is switched on. This causes the reservoir pressure to increase. The reservoir pressure continues to increase until constantly energized inlet valve (e.g. MV_UVR) can no longer hold the pressure which prevails at its inlet side and slowly opens. This results in a pressure increase in this wheel which is being measured, if the switching valves (separating valves, balance valves, relief valves, etc.) are closed. Therefore wheel pressure $P_{RAD}$ of the wheel brake assigned to the energized inlet valve is detected in step 204. In subsequent step 206, a check is performed to determine whether the wheel brake pressure has increased. This is done, in the preferred exemplary embodiment, in that the currently measured wheel pressure is compared with a previously measured wheel pressure value. If step 206 has shown that a wheel brake pressure increase has taken place, the current reservoir pressure value is stored in memory as the reservoir pressure reference value, in subsequent step 208. Furthermore, the pump is shut off and the current applied to the inlet valve is set to zero. If step 206 has not shown any wheel brake pressure increase, the program section is repeated with step 204. For the sake of clarity, it is not shown that the program section according to FIG. 3 is terminated if, for example, there is a brake pressure demand, the driver activates the brake pedal, or, for example, no wheel brake pressure increase was recognized after expiration of a maximum period of time.

FIG. 4, in the form of a flow chart, outlines an exemplary program which estimates the reservoir pressure on the basis of a model, in case of failure of the reservoir pressure detection system. The program outlined in FIG. 4 is initiated, in this connection, if a failure or defect of the reservoir pressure detection system was recognized. This is determined if the reservoir pressure signal is abnormal, e.g. goes outside of its pre-determined value range, and/or if an impermissible change of the signal is recognized. Then the program runs at pre-determined points in time.

In first step 300, a check is performed to determine whether a new determination of the reference value has been made, within the scope of the program shown in FIG. 3. If a reference value was newly determined, the estimated reservoir pressure value of the previous run $PSP_{n-1}$ is set to reference value $PSP_{REF}$ in subsequent step 302. If no new reference value is present, i.e. if no new reference value was determined directly before the current program run, then the sequence continues with step 304. In step 304, the voltage at the connectors of the pump motor $U_{PUMPMOT}$ as well as wheel brake pressure $P_{RAD}$ is read in. In subsequent step 306, volume $V_{ZU}$ flowing to the reservoir is calculated on the basis of pump motor voltage $U_{PUMPMOT}$. This is done, in the preferred exemplary embodiment, on the basis of a table or characteristic curve in which the transport output and therefore the volume flowing to the reservoir is stored in memory as a function of the prevailing pump motor voltage. In an advantageous exemplary embodiment, the temperature of the hydraulic unit of the brake system is furthermore also taken into consideration, since the transport output of the pump is dependent on temperature. In subsequent step 308, outflowing volume $V_{AB}$ is determined on the basis of wheel brake pressure $P_{RAD}$. In this connection, the P/V characteristic curves of the wheel circuit which are specific to the vehicle are known. They are the basis of the calculation of outflowing volumes. Furthermore, the current wheel pressures are known for each calculation cycle of the model. On the basis of the brake pressure and the known characteristic curve, the volume consumption, i.e. the volume flowing out of the reservoir, is determined for every wheel circuit in this way. The entire outflowing volume is calculated from the contributions of the individual wheel circuits, for example by addition. From the calculated inflowing and outflowing volumes, reservoir pressure $PSP_n$ is then estimated in subsequent step 310. This is done, in the preferred exemplary embodiment, using the general gas equation:

$$(P*V)/T = \text{constant where: P=pressure; V=volume; T=temperature.}$$

Here, the temperature is assumed to be constant, so that the change in reservoir pressure can be calculated from the change in volume. In this connection, reservoir pressure $PSP_{n-1}$ estimated from the previous program run is also used, so that a conclusion is drawn from the volume change, leading to the pressure change and therefore to the current reservoir pressure.

What is claimed is:

1. A method for controlling a brake system, comprising the steps of:

electrically controlling a brake pressure in at least one wheel brake as a function of a driver's braking request;

when there is a failure of a reservoir pressure detection system: estimating a pressure of a high-pressure reservoir using a model, and controlling the brake system as a function of the estimated reservoir pressure, wherein the estimated reservoir pressure is determined as a function an estimated inflowing volume and an estimated outflowing volume of fluid, and wherein the estimated outflowing volume is determined as a function of a known pressure/volume characteristic curve of a circuit of the at least one wheel brake and the brake pressure of the at least one wheel brake.

2. A method for controlling a brake system, comprising the steps of:

electrically controlling a brake pressure in at least one wheel brake as a function of a driver's braking request; and when there is a failure of a reservoir pressure detection system: estimating a pressure of a high-pressure reservoir using a model, and controlling the brake system as a function of the estimated reservoir pressure, wherein the estimated reservoir pressure is determined as a function of an inflowing volume and an outflowing volume of a fluid by using a general gas equation.

3. A method for controlling a brake system, comprising the steps of:

electrically controlling a brake pressure in at least one wheel brake as a function of a driver's braking request; and when there is a failure of the reservoir pressure detection system: estimating a pressure of a high-pressure reservoir using a model, and controlling the brake system as a function of the estimated reservoir pressure; and determining a pressure reference value for the model, wherein the pressure reference value is used in estimating the reservoir pressure.

4. The method according to claim 3, wherein the pressure reference value is determined outside of braking procedures and other brake pressure requirements.

5. The method according to claim 3, further comprising the steps of:

increasing the reservoir pressure with an electrically driven pump to determine the pressure reference value; and storing the reference value in a memory when the brake pressure of the at least one wheel brake increases.

6. The method according to claim 3, wherein the braking system includes an electrically-controlled valve, the electrically-controlled valve having a trigger current value that causes the valve to open at a pre-determined pressure, further comprising the step of applying to the electrically-controlled valve a current slightly less than the trigger current value.

7. An apparatus for controlling a brake system including a high-pressure reservoir, comprising:

an electronic control unit which electrically controls a brake pressure in at least one wheel brake, wherein the brake pressure is controlled as a function of a braking request by a driver; and a reservoir pressure detection system to detect a pressure of the high-pressure reservoir and transmit the detected reservoir pressure to the electronic control unit, wherein the electronic control unit controls the brake system as a function of the detected reservoir pressure, and wherein the electronic control unit estimates a reservoir pressure using a model and controls the brake system as a function of the estimated reservoir pressure if there is a failure of the reservoir pressure detection system, said model including an adjustment for temperature.

8. A method for controlling a brake system, comprising the steps of:

electrically controlling a brake pressure in at least one wheel brake as a function of a driver's braking request;

in case of failure of a system for detecting a pressure of a high-pressure reservoir, estimating the pressure of the high-pressure reservoir using a calculation model, wherein the model includes an adjustment for temperature;

and controlling the brake system as a function of the estimated reservoir pressure.

9. The method according to claim 8, wherein the brake system includes a hydraulic unit, said hydraulic unit having a temperature, and the adjustment for temperature included in the calculation model is a function of the temperature of the hydraulic unit.

10. The method according to claim 8, wherein the brake system includes a pump, and the adjustment for temperature included in the calculation model is a function of the temperature of the pump after-run.

11. A method for controlling a brake system, comprising the steps of:

electrically controlling a brake pressure in at least one wheel brake as a function of a driver's braking request;

measuring a reservoir pressure by a reservoir pressure detection system;

activating a pump to increase the pressure in the reservoir as a function of the measured reservoir pressure value;

detecting a failure of the reservoir pressure detection system when such failure occurs;

estimating the pressure of the reservoir using a model; and when there is a failure of the reservoir pressure detection system, activating the pump as a function of the estimated reservoir pressure.

12. An apparatus for controlling a brake system, comprising:

an electronic control unit which electrically controls a brake pressure in at least one wheel brake as a function of a braking request by a driver; and a reservoir pressure detection system to detect a pressure of a reservoir and transmit the detected reservoir pressure to the electronic control unit;

a pump for adjusting the pressure in the reservoir;

wherein the electronic control unit activates the pump to increase the pressure in the reservoir as a function of the detected reservoir pressure, and wherein the electronic control unit estimates a reservoir pressure using a model and activates the pump as a function of the estimated reservoir pressure when there is a failure of the reservoir pressure detection system.

* * * * *